Sept. 4, 1962 J. W. SHIRLEY ET AL 3,052,211
APPARATUS FOR STRIPING FABRIC MATERIAL
Filed Oct. 23, 1957 2 Sheets-Sheet 1
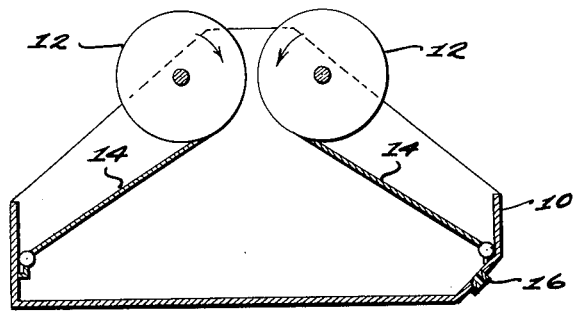
Fig. 1
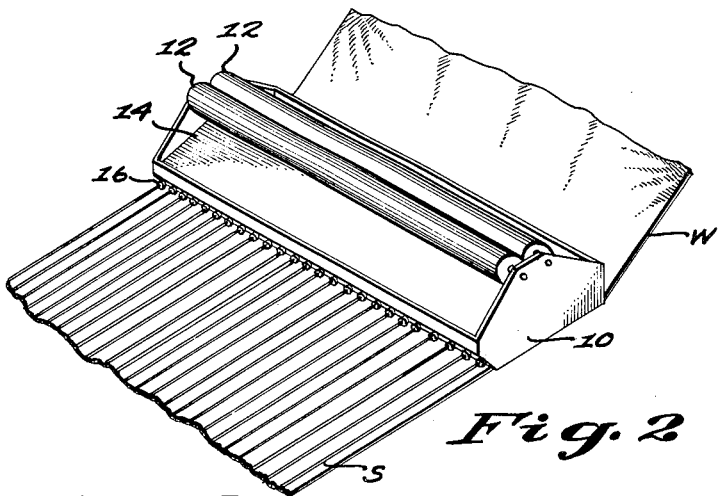
Fig. 2
Fig. 3
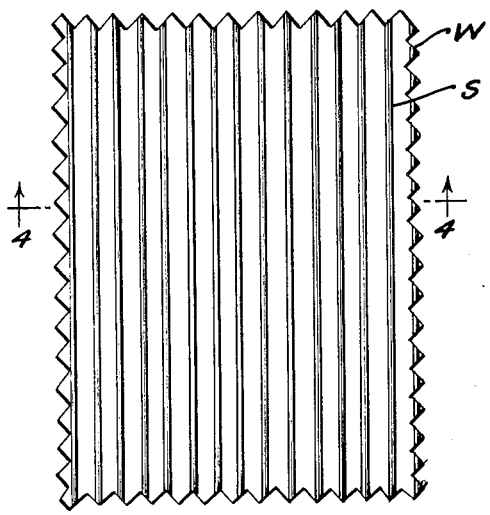
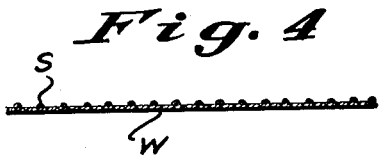
Fig. 4
INVENTORS
JULIAN W. SHIRLEY &
GRAVES T. GORE
BY
Parrott & Richards
ATTORNEYS

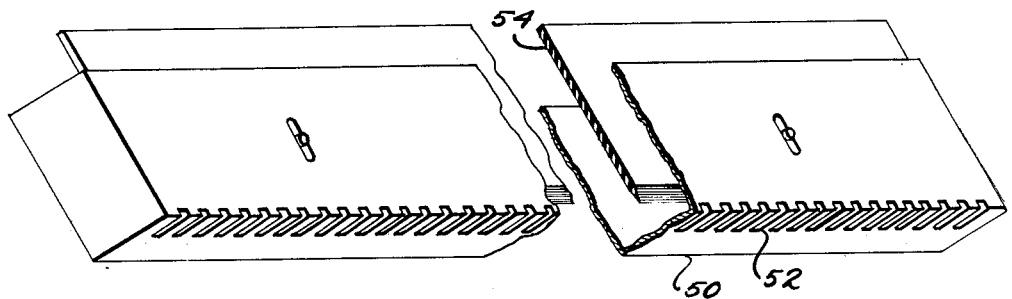
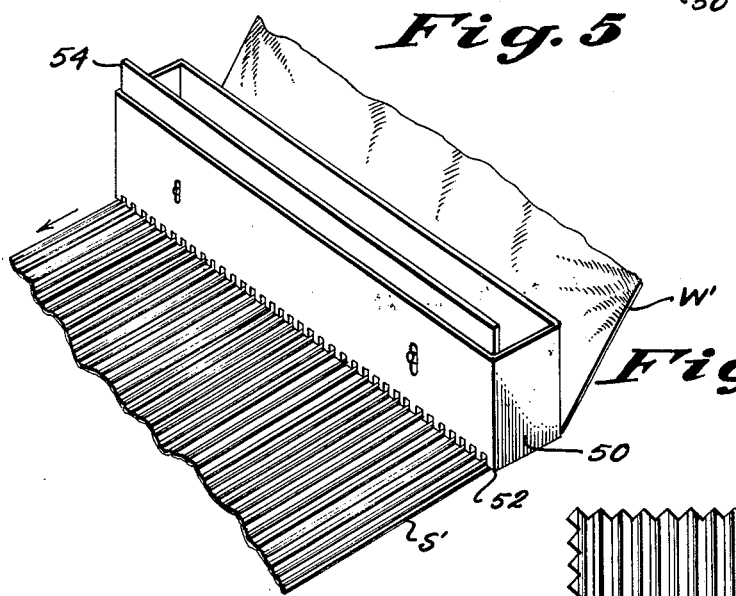
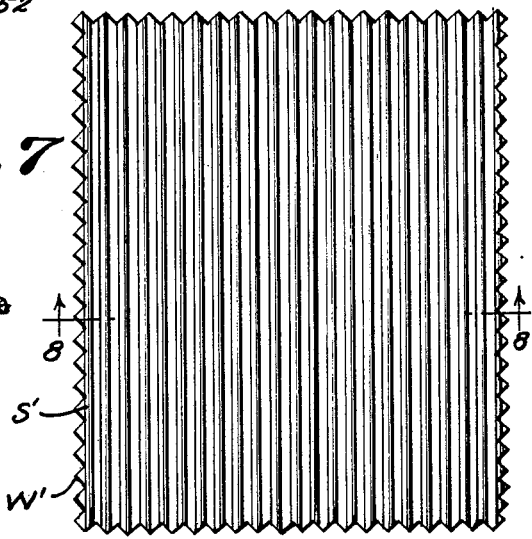
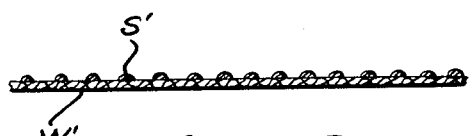

United States Patent Office 3,052,211
Patented Sept. 4, 1962

3,052,211
APPARATUS FOR STRIPING FABRIC MATERIAL
Julian W. Shirley and Graves T. Gore, Ware Shoals, S.C., assignors to Riegel Textile Corporation, a corporation of Delaware
Filed Oct. 23, 1957, Ser. No. 691,988
2 Claims. (Cl. 118—315)

This invention relates to apparatus for striping fabric material, and more particularly to apparatus for applying elongated continuous spaced ribs of viscous material on a traveling base sheet.

The apparatus of the present invention comprises a closed supply reservoir having an inlet opening and a plurality of spaced discharge nozzles. Viscous material is fed into the reservoir by a pair of closely spaced parallel feeding and pumping rolls mounted across the inlet opening. The rolls are rotated in opposite directions to feed the viscous material into the reservoir and to apply a pumping action to the viscous material confined within the closed reservoir to cause the viscous material to flow through the nozzles onto the base sheet.

The features and advantages of the present invention will be apparent from the following description and accompanying drawings in which:

FIG. 1 is a more or less diagrammatic sectional detail of a preferred means for applying plastic stripes according to the present invention;

FIG. 2 is a perspective illustration of the manner in which a fabric web or the like is handled in relation to the means shown in FIG. 1 for application of plastic stripes thereto;

FIG. 3 is a plan view of a fragmentary portion of the plastic striped web illustrated in FIG. 2;

FIG. 4 is an exaggerated sectional detail taken substantially on the line 4—4 in FIG. 3;

FIG. 5 is a perspective detail, partly broken away, illustrating the arrangement of alternative means for applying plastic stripes in accordance with the present invention;

FIG. 6 is a further perspective detail illustrating the manner of handling a fabric web or the like for application of plastic stripes thereto by the means shown in FIG. 5;

FIG. 7 is a fragmentary plan view of the plastic striped web shown in FIG. 6; and FIG. 8 is an exaggerated section taken substantially on the line 8—8 in FIG. 7.

Referring now in detail to the drawings, the means shown in FIG. 1 for applying plastic stripes S to a web W, as seen in FIG. 2, comprises a supply reservoir 10 arranged for disposition transversely over a traveling fabric base web such as W. The top of this supply reservoir 10 is formed by a pair of closely spaced parallel feeding rolls 12 that are rotated in opposite directions to travel downwardly with respect to the supply reservoir 10 at their adjacent surfaces, and by a pair of doctor blades 14 acting on the respective feeding rolls 12 and arranged to form an air-tight closure at the top of reservoir 10 which in turn has a plurality of discharge nozzles 16 arranged at the bottom thereof for discharge in spaced alignment with the traveling direction of the base web W.

The viscous composition for forming the viscous stripes is delivered by any suitable means such as a perforated supply line (not shown) above the pair of feeding rolls 12, the rotating motion of which results in carrying the delivered viscous composition downwardly therebetween for removal by the doctor blades 14 and accumulation within the supply reservoir 10. The action of the feeding rolls 12 as arranged in this manner is in the nature of a pumping action, and not only serves to transfer the delivered viscous composition to the supply reservoir 10 but also to build up a pressure therein. The amount of pressure resulting from the roll action depends on the speed of rotation and the spacing of the rolls 12, and the roll spacing is preferably made adjustable so as to regulate the pressure as desired, the pressure being increased by decreasing the roll spacing and a relatively close roll spacing, under some circumstances as close as a few thousandths inch, being employed. Also, the roll speed may be made adjustable for pressure regulation, if desired.

As illustrated in FIGS. 1 and 2, the pair of feeding rolls 12 reach entirely across the top of the supply reservoir 10 and the resulting feeding action is accordingly applied in a uniform manner along the entire length of the supply reservoir 10 so that the previously mentioned discharge nozzles 16 arranged at the bottom thereof are made to deliver uniform streams of the viscous material onto the web W to form the stripes S as the web W is made to travel linearly thereby. In this way, viscous composition streams of substantial cross sectional dimensions can be deposited readily on the web W, and a substantially raised stripe is obtained on the base web W as indicated in FIGS. 3 and 4 in which the spaced parallel arrangement of the stripes S on the web W are represented in FIG. 3, and the substantially raised configuration of the stripes S in FIG. 4; the result being a decorated fabric or other sheet material having a unique appearance and hand without modifying the base material otherwise in any way, such as with a continuous base coating or the like.

FIGS. 5 and 6 illustrate an alternative means for applying viscous stripes S' according to the present invention comprising a supply reservoir 50, to which the viscous composition for forming the stripes may be fed in any convenient manner such as by a perforated supply pipe or the like (not shown), and in which the bottom is slotted as at 52 adjacent the side edge thereof facing in the direction in which a base web W' is made to travel thereby as seen in FIG. 6. The bottom slots 52 are aligned longitudinally of the direction of web travel and extend to the adjacent bottom side edge of the supply reservoir 50 so as to open thereat and to continue upwardly in the adjacent side of the reservoir 50 in excess of the thickness of the reservoir bottom. At the inner face of the adjacent reservoir side, a wiper blade 54 is installed for vertical adjustment to regulate the effective open end height of the slots 52 and thereby regulate the heightwise cross sectional dimension of the stream of viscous material that will flow through the slots 52 from the reservoir 50 to form the stripes S' on a web W' made to travel thereby as indicated in FIG. 6. The resulting striped material, having spaced parallel stripes S' of substantially raised configuration, as illustrated in FIGS. 7 and 8, will normally be characterized by a coarser or heavier striped configuration than that provided in the manner illustrated in FIGS. 1 to 4 by which stripes S of relatively fine dimensions can be obtained if desired, although this first described embodiment can also be used satisfactorily for heavier striping too.

The present invention has been described in detail above for purposes of illustration only and is not intended to be limited by this description or otherwise except as defined in the appended claims.

We claim:
1. Apparatus for applying elongated continuous spaced ribs of viscous material on a traveling base sheet comprising a closed supply reservoir containing the viscous material, said reservoir being provided with an inlet opening for replenishing the supply of viscous material and with a plurality of discharge nozzles for discharging streams of the viscous material in spaced alignment with the direction of travel of said base sheet, a pair of closely spaced parallel feeding and pumping rolls mounted across the inlet opening of said supply reservoir and rotated in opposite directions for feeding the viscous material to said reservoir and discharging it through said discharge nozzles under pressure, said feeding rolls providing a pumping action for the material confined within the closed reservoir and thereby causing it to flow in streams through the nozzles onto said base sheet.

2. Apparatus as defined in claim 1 and including means associated with the feeding and pumping rolls at the inlet opening of the reservoir for forming the inlet opening and engaging with the rolls for removing any excess of viscous material from the rolls.

References Cited in the file of this patent

UNITED STATES PATENTS

| | | |
|---|---|---|
| 375,233 | Videto | Dec. 20, 1887 |
| 375,478 | Derick | Dec. 27, 1887 |
| 806,923 | Sandstrom | Dec. 12, 1905 |
| 1,625,863 | McLarty | Apr. 26, 1927 |
| 1,730,673 | Mell | Oct. 8, 1929 |
| 2,210,116 | Dreyfus | Aug. 6, 1940 |
| 2,319,852 | Doolittle | May 25, 1943 |
| 2,771,636 | McIntosh et al. | Nov. 27, 1956 |
| 2,798,820 | Nelson | July 9, 1957 |

FOREIGN PATENTS

| | | |
|---|---|---|
| 574,157 | Great Britain | Dec. 21, 1945 |